United States Patent [19]

Blaimschein et al.

[11] Patent Number: 5,062,332
[45] Date of Patent: Nov. 5, 1991

[54] CUTTING MACHINE FOR CUTTING FLAT WORKPIECES

[75] Inventors: Gottfried Blaimschein, Steyr; Harald Dietachmayr, Ternberg, both of Austria

[73] Assignee: GMF Gesellschaft für Fertigungstechnik und Maschinenbau Aktiengesellschaft, Steyr, Austria

[21] Appl. No.: 586,420

[22] Filed: Sep. 21, 1990

[30] Foreign Application Priority Data

Sep. 25, 1989 [EP] European Pat. Off. ........... 89890248

[51] Int. Cl.5 .............................................. B23Q 17/22
[52] U.S. Cl. ....................................... 83/74; 33/1 PT; 364/474.32; 83/522.16; 83/701
[58] Field of Search ...................... 83/74, 13, 701, 940, 83/875, 861, 522.16; 33/1 PT, 1 N, 556, 558; 409/304; 364/474.09, 474.32

[56] References Cited

U.S. PATENT DOCUMENTS

| | | | |
|---|---|---|---|
| 3,183,597 | 5/1965 | Donaldson et al. | 33/556 |
| 3,955,458 | 5/1976 | Pearl | 83/940 |
| 4,133,234 | 1/1979 | Gerber | 83/74 |
| 4,902,495 | 4/1990 | Pilkington | 83/940 |

FOREIGN PATENT DOCUMENTS 2206513 1/1989 United Kingdom ................ 409/304

Primary Examiner—Hien H. Phan
Assistant Examiner—Raymond D. Woods
Attorney, Agent, or Firm—Collard, Roe & Galgano

[57] ABSTRACT

A cutting machine for cutting a flat workpiece comprises a cutting table having a working surface for supporting the flat workpiece, a support movable parallel to the working surface, and a cutting unit mounted on the support above the working surface, the cutting unit comprising a cutting knife vertically adjustable relative to the working surface to regulate the cutting depth of the knife, a vertically displaceable carriage for the cutting knife for vertically adjusting the knife, a cutting knife holder rotatable about a vertical axis for orienting the knife in a desired direction, and drives actuatable for displacing the carriage, rotating the holder and moving the support in response to a programmable control. To engage the position of the cutting knife to be efficiently adjusted, a setting device is provided, the setting device comprising a vertically extending positioning path indicator arranged to indicate the actual position of the cutting knife in a set position and to transmit to the control a signal corresponding to a deviation of the actual position from a pre-set vertical position of the indicator relative to the working surface whereby a reference point for the vertical adjustment of the cutting knife is put in the control.

2 Claims, 2 Drawing Sheets 5,062,332

CUTTING MACHINE FOR CUTTING FLAT WORKPIECES

BACKGROUND OF THE INVENTION

1. Field of the Invention

The present invention relates to a cutting machine for cutting a flat workpiece, which comprises a cutting table having a working surface for supporting the flat workpiece, a support movable substantially parallel to the working surface, and a cutting unit mounted on the support above the working surface, the cutting unit comprising a cutting knife vertically adjustable relative to the working surface to regulate the cutting depth of the knife, a vertically displaceable carriage for the cutting knife for vertically adjusting the knife, a cutting knife holder rotatable about a vertical axis for orienting the knife in a desired direction, and drive means actuatable for displacing the carriage, rotating the holder and moving the support in response to a programmable control.

2. Description of the Prior Art

Cutting machines of this type permit the cutting depth of the knife to be exactly controlled so that, for example, a multi-ply flat workpiece may be so cut that only a predetermined number of plies are penetrated by the knife while plies underlying the cut plies remain integral. This may be of particular importance in cutting patterns out of laminates since this requires the carrier layer to remain uncut. Such cutting machines operate very well with cutting knives vibrated by ultrasound frequencies. To set the cutting depth of the knife accurately it is required to determine the exact vertical distance of the cutting knife edge from the working surface whereon the flat workpiece is placed and to be able to determine a reference point for the desired vertical adjustment. This has been done heretofore by carefully lowering the vertically displaceable cutting knife carriage towards the working surface until the cutting knife edge touches a measuring strip on the working surface. This is a very time-consuming operation and, furthermore, does not assure the desired accuracy of the setting. Since the cutting knife must be re-set after each change of knives and even during the use of one knife to correct the wear of the knife edge, this adjustment operation considerably slows the entire cutting operation.

In addition, since the knife must be tangentially guided along a cutting line to obtain the desired pattern, the angular position of the knife must also be set and the control must receive a signal determining a reference point for the angular setting of the cutting knife.

SUMMARY OF THE INVENTION

It is the primary object of this invention to obviate the indicated disadvantages in the adjustment of the cutting knife in cutting machines of the first-described type and to provide an efficiently operating setting device for the cutting knife.

The above and other objects are accomplished according to the invention with a setting device comprising a vertically extending positioning path indicator arranged to indicate the actual position of the cutting knife in a set position and to transmit to the control a signal corresponding to a deviation of the actual position from a pre-set vertical position of the indicator relative to the working surface whereby a reference point for the vertical adjustment of the cutting knife is put in the control.

For the controlled setting of the vertical position of the cutting knife, it is only necessary to move the cutting unit to the setting device arranged at a suitable location of the cutting machine and to lower the cutting knife to an adjusting position within the range of the indicator. The positioning path indicator measures the distance of the path between the pre-set vertical zero position of the indicator and the actual position thereof and transmits a corresponding reference point signal to the control for adjusting the cutting knife edge to the desired height, the control actuating the drive for the cutting knife carriage so that the cutting knife edge is brought to the desired vertical position above the working surface relative to this reference point. This quick and simple setting of the reference point for the controlled vertical adjustment of the cutting knife facilitates the proper adjustment of the knife not only after every knife replacement but also at any desired time during the cutting operation since any wear of the knife edge may be ascertained by comparing the measuring data signals transmitted by the indicator to the control, and the vertical position of the knife may be controlled in response to these signals.

To enable the angular position of the cutting knife to be automatically controlled, too, the setting device further comprises a horizontally extending positioning path indicator arranged to indicate the changing angular positions of the cutting knife in set positions occurring during rotation of the cutting knife holder about the vertical axis and to transmit to the control signals corresponding to the angular positions whereby a reference point for the angular adjustment of the cutting knife is put in the control.

The signals transmitted from the pre-set horizontally extending indicator and put in the control produce a reference point for the angular setting of the knife, enabling the programmed control to rotate the knife holder in dependence on this reference point until it has assumed the desired angular position.

While any type of positioning path indicators or measuring instruments operating with the desired accuracy may be used in the setting device of the present invention, including contact-less indicators, such as optical length measuring instruments, it is preferred for reasons of simplicity and robust construction to use mechanical-electrical indicators, such as an induction positioning path measuring instrument with a measuring head arranged to be engaged by the cutting knife upon vertical and lateral displacement thereof, respectively. Such instruments require little space, are readily set and produce the desired measuring precision.

According to a preferred feature of the invention, the cutting machine further comprises a common housing for the vertically and horizontally extending indicators, the horizontally extending indicator being arranged in a plane defined by the pre-set vertical position of the vertically extending indicator. This provides a space-saving arrangement and enables the setting device to be arranged anywhere, for example on the cutting table. However, it will be advantageous to mount the common housing for the indicators on the support because this shortens the movement of the cutting unit into measuring range of the pre-setting device. Since the measuring ranges of the two positioning path indicators adjoin each other, it is possible to control the adjustment of the vertical and angular position of the cutting knife at the same time and while the cutting knife is substantially in the same position.

BRIEF DESCRIPTION OF THE DRAWING

The above and other objects, advantages and features of this invention will become more apparent from the following detailed description of a now preferred embodiment thereof, taken in conjunction with the accompanying, schematic drawing wherein.

DETAILED DESCRIPTION OF PREFERRED EMBODIMENT

Figure 1:
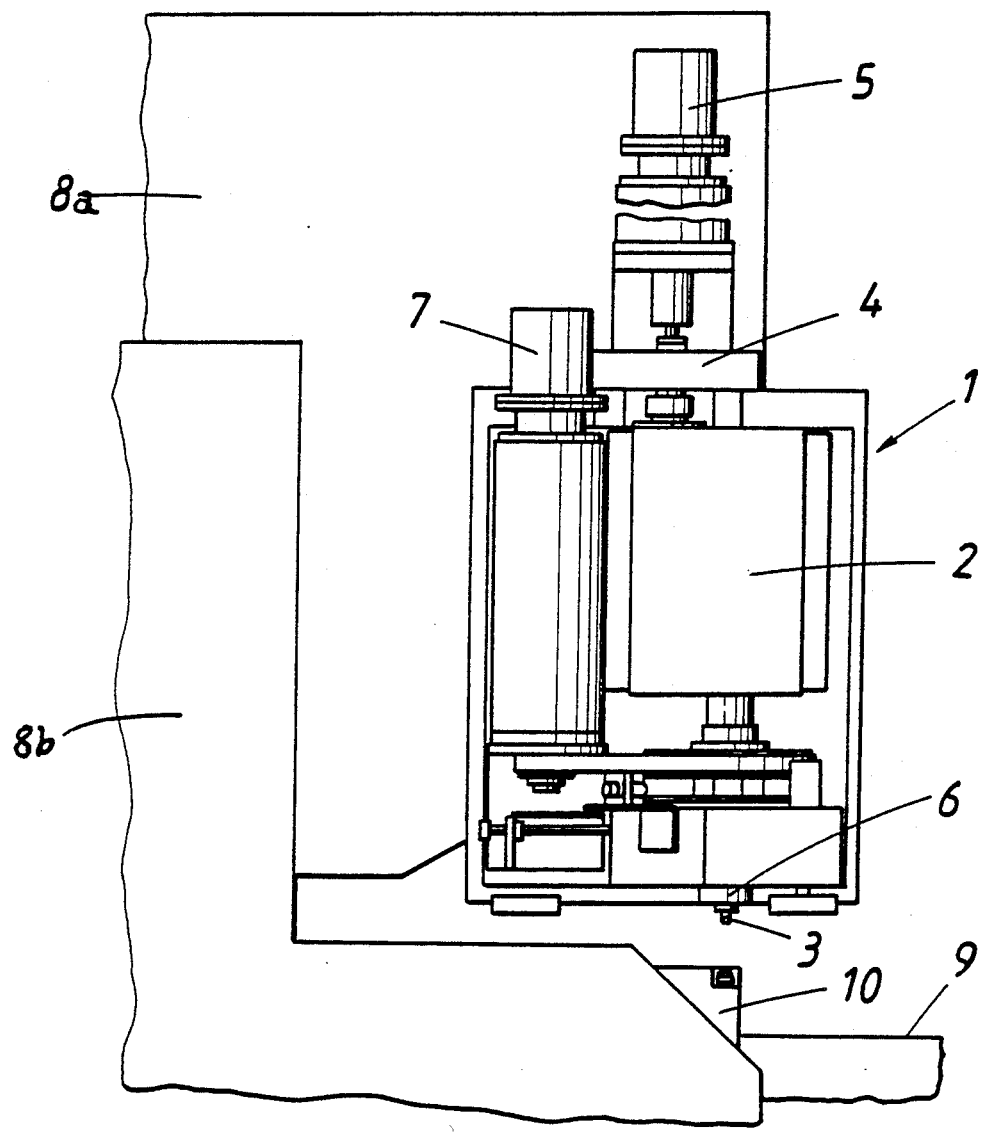
FIG. 1 is a fragmentary side elevational view of a cutting machine.

Referring now to the drawings, there is shown a cutting machine for cutting a flat workpiece. The cutting machine comprises a cutting table having working surface 9 for supporting the flat workpiece, support 8a, 8b movable substantially parallel to the working surface, and cutting unit 1 mounted on the support above the working surface. The cutting unit comprises cutting knife 3 vertically adjustable relative to working surface 9 to regulate the cutting depth of the knife, vertically displaceable carriage 4 for the cutting knife for vertically adjusting the knife, cutting knife holder 6 rotatable about a vertical axis for orienting the knife in a desired direction, and drives 5 and 7 actuatable for displacing carriage 4 and for rotating holder 6 in response to a programmable control. The cutting knife is connected to ultrasound generating head 2 for vibrating the knife. Programmable controls for actuating drives are well known articles of commerce and need not be further described. Actuation of drive 5 enables the vertical position of cutting knife 3 to be adjusted relative to the flat workpiece o working surface 9 while actuation of drive 7 rotating knife holder 6 enables the knife to be guided tangentially along a desired cutting line. The movable support diagrammatically indicated to be comprised of a longitudinal and transverse carriages 8a, 8b enables cutting unit 1 to be moved over working surface 9 so that cutting knife 3 may follow any desired cutting line for cutting a pattern in a workpiece on working surface 9. The control for drives 5 and 7 also controls the movement of support 8a , 8b in a plane parallel to working surface 9.

To control the cutting depth and the angular position of knife 3 automatically, a respective reference point for its vertical and angular position must be put in the control and, for this purpose, the present invention provides setting device 10 which comprises vertically extending positioning path indicator 11 arranged to indicate the actual position of the cutting knife in a set position and to transmit to the control a signal corresponding to a deviation of the actual position from a pre-set vertical position of the indicator relative to the working surface whereby a reference point for the vertical adjustment of the cutting knife is put in the control. The illustrated indicator has positioning path measuring head 12 arranged to be engaged by the cutting knife upon vertical displacement thereof, the actual position of the measuring head and the deviation thereof from a pre-set vertical position determining the signal transmitted to the control. The measuring head is provided on a screw vertically adjustably mounted in the indicator which is an induction positioning path measuring instrument. Setting device 10 further comprises horizontally extending positioning path indicator 13 arranged to indicate the changing angular positions of the cutting knife in set positions occurring during rotation of the cutting knife holder about the vertical axis and t transmit to the control signals corresponding to the angular positions whereby a reference point for the angular adjustment of the cutting knife is put in the control. Indicator 13 is also an induction positioning path measuring instrument having measuring head 14 arranged to be engaged by the cutting knife upon lateral displacement thereof.

The illustrated setting device further comprises common housing 15 for vertically and horizontally extending indicators 11 and 13, horizontally extending indicator 13 being arranged in a plane defined by the pre-set vertical position of measuring head 12 of vertically extending indicator 11. The common housing for the indicators is mounted on support carriage 8b.

Figure 2:
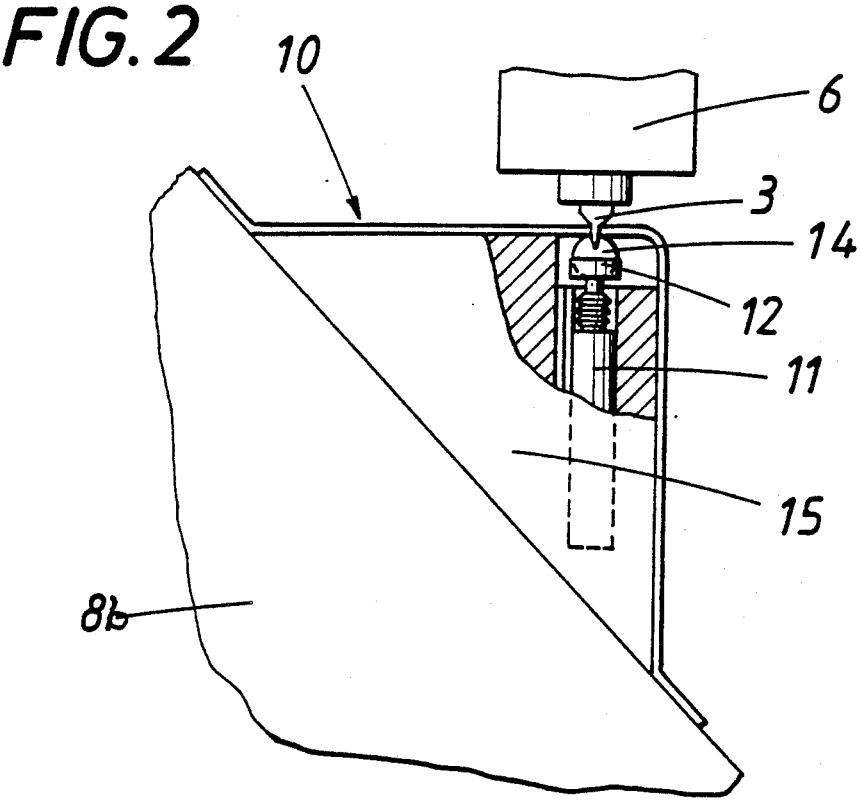
FIGS. 2 and 3 are enlarged, fragmentary and partly sectioned side elevational and end views, respectively, of the setting device of the invention.

When it is desired to transmit a reference point signal for the vertical adjustment of cutting knife 3 to the control, it is only necessary to drive support carriages 8a, 8b to position the cutting knife above vertically extending indicator 11 and to lower carriage 4 until the cutting knife edge contacts measuring head 12 (see FIG. 2). Since the level of the measuring head relative to working surface 9 is pre-set, the deviation of the position of the measuring head after contact with the knife edge from the initial position indicates an exact measurement of the actual vertical position of cutting knife 3, and a corresponding signal transmitted to the control will produce an exact reference point in the control.

Figure 3:
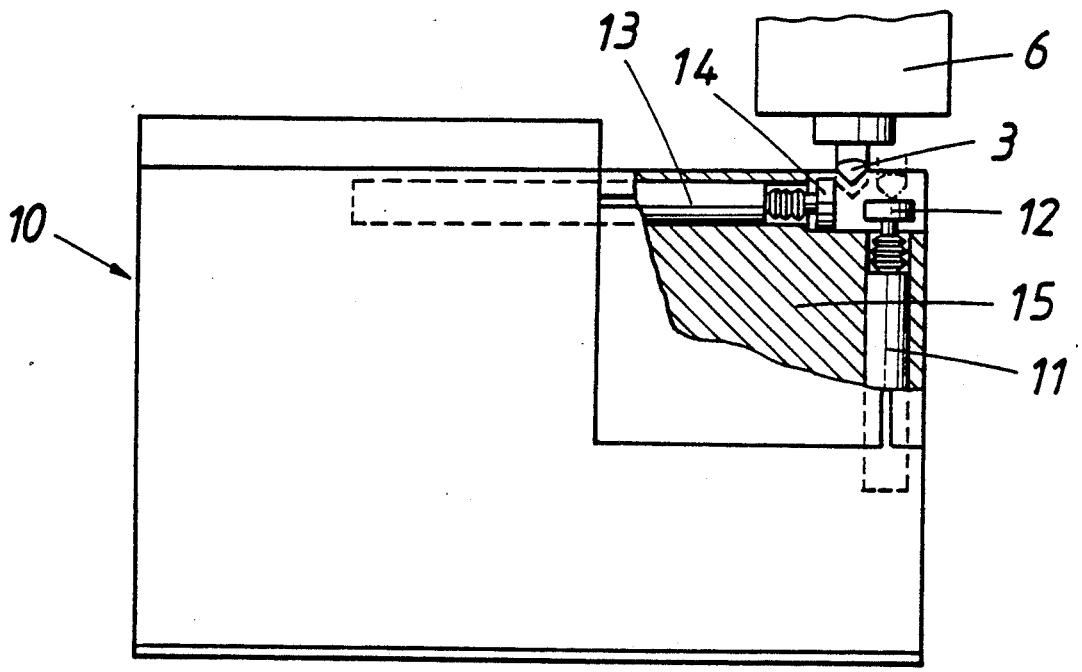

To control the angular position of cutting knife 3 (see FIG. 3), the cutting knife is moved laterally until it contacts measuring head 14 of horizontally extending indicator 13, and drive 7 is then actuated to rotate cutting knife holder 6. Deviations of the angular positions of the cutting knife from a pre-set initial position in dependence on the cross sectional geometry of the knife are measured by indicator 13 and a corresponding signal put in the control permits the angular position of the cutting knife to be determined in this manner, the measuring data transmitted to the control during the rotation of the cutting knife being instantly computed in the control to produce an angle reference point.

Setting device 10 may be mounted anywhere on the cutting machine where it is accessible to cutting knife 3. It is preferred to mount it on support 8b at a location reachable by cutting unit 1 along the shortest possible path so that an adjustment of the cutting knife position may be effected at any time without undue delay.

What is claimed is:

1. A cutting machine for cutting a flat workpiece, which comprises
  (a) a cutting table having a working surface for supporting the flat workpiece,
  (b) a support movable substantially parallel to the working surface,
  (c) a cutting unit mounted on the support above the working surface, the cutting unit comprising
    (1) a cutting knife vertically adjustable perpendicularly to the working surface to regulate the cutting depth of the knife,
    (2) a vertically displaceable carriage for the cutting knife for vertically adjusting the knife,
    (3) a cutting knife holder rotatable about a vertical axis for orienting the knife into desired angular positions, and (4) drive means actuatable for displacing the carriage rotating the holder and moving the support relative to each other in response to a programmable control, and
(d) a setting device for the cutting knife, the setting device being mounted on the support and comprising
  (1) a vertically extending positioning path indicator extending perpendicularly to the working surface and having a measuring head arranged to be engaged by the cutting knife upon vertical displacement thereof to indicate the actual position of the cutting knife in a set position and to transmit to the control a signal determined by a deviation of the actual position of the measuring head from a pre-set vertical position thereof relative to the working surface whereby a reference point for the vertical adjustment of the cutting knife is put in the control,
  (2) a horizontally extending positioning path indicator extending in a plane parallel to the working surface and defined by the pre-set vertical position of the measuring head, the horizontally extending positioning path indicator having a measuring head arranged to be engaged by the cutting knife upon angular displacement thereof in the pre-set vertical position to indicate the changing angular positions of the cutting knife in set positions occurring during rotation of the cutting knife holder about the vertical axis and to transmit to the control signals corresponding to the angular positions whereby a reference point for the angular adjustment of the cutting knife is put in the control, and
  (3) a common housing for the vertically and horizontally extending positioning path indicators.

2. The cutting machine of claim 1, wherein the indicators are induction positioning path measuring instruments.

* * * * *